US012332596B2

(12) United States Patent
Tanaka

(10) Patent No.: US 12,332,596 B2
(45) Date of Patent: Jun. 17, 2025

(54) IMAGE FORMING APPARATUS, METHOD, AND STORAGE MEDIUM

(71) Applicant: Toshiba Tec Kabushiki Kaisha, Tokyo (JP)

(72) Inventor: Masaya Tanaka, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/410,862

(22) Filed: Jan. 11, 2024

(65) Prior Publication Data

US 2024/0427275 A1 Dec. 26, 2024

(30) Foreign Application Priority Data

Jun. 26, 2023 (JP) ................................ 2023-104470

(51) Int. Cl.
*G03G 15/20* (2006.01)
*G03G 15/00* (2006.01)

(52) U.S. Cl.
CPC ..... *G03G 15/5066* (2013.01); *G03G 15/2003* (2013.01); *G03G 15/2032* (2013.01); *G03G 15/5054* (2013.01)

(58) Field of Classification Search
CPC .................................................. G03G 15/2032
See application file for complete search history.

(56) References Cited

U.S. PATENT DOCUMENTS

| | | | | |
|---|---|---|---|---|
| 8,112,022 B2 * | 2/2012 | Okamoto | G03G 15/2025 399/328 |
| 10,725,409 B1 * | 7/2020 | Sato | G03G 15/607 |
| 11,199,797 B2 * | 12/2021 | Usami | G03G 15/2053 |
| 2010/0239292 A1 | 9/2010 | Fujita et al. | |
| 2021/0309484 A1 | 10/2021 | Mitsuno | |

FOREIGN PATENT DOCUMENTS

| | | |
|---|---|---|
| JP | 2003-050514 A | 2/2003 |
| JP | 2005-225043 A | 8/2005 |

* cited by examiner

*Primary Examiner* — Leon W Rhodes, Jr.
(74) *Attorney, Agent, or Firm* — Kim & Stewart LLP

(57) ABSTRACT

An image forming apparatus includes a conveyance mechanism, a wireless tag communication device, an image forming mechanism, a fixing device including a heating device to heat a medium passing between fixing and pressing members, and a moving mechanism by which a distance between the fixing and pressing members can be changed, and a processor to control the conveyance mechanism to convey a medium, control the communication device to perform a writing process on a tag attached to the medium, and control the forming mechanism and the fixing device to perform a forming process on the medium. The processor controls the fixing device to set the distance at a first distance during a first period before a timing corresponding to completion of the writing process and at a second distance less than the first distance during a second period after the timing.

20 Claims, 8 Drawing Sheets

IMAGE FORMING APPARATUS, METHOD, AND STORAGE MEDIUM

CROSS-REFERENCE TO RELATED APPLICATION

This application is based upon and claims the benefit of priority from Japanese Patent Application No. 2023-104470, filed Jun. 26, 2023, the entire contents of which are incorporated herein by reference.

FIELD

Embodiments described herein relate generally to an image forming apparatus, a method, and a storage medium.

BACKGROUND

In order to prevent tag information from being written to a wrong (radio frequency identification) RFID tag, a conventional image forming apparatus adjusts the timing at which each of multiple printing media, which are to be conveyed consecutively, starts to be conveyed. With this configuration, the image forming apparatus can make the distance between the printing media sufficiently long and thereby prevent tag information from being written to a wrong RFID tag. However, with this image forming apparatus, the driving time of a fixing device included in the image forming apparatus may increase as the distance between the printing media increases and as a result, the life of the fixing device may decrease.

SUMMARY OF THE INVENTION

An aspect of this disclosure provides an image forming apparatus that can prevent tag information from being written to a wrong wireless tag and also prevent the life of a fixing device from decreasing.

According to an aspect of this disclosure, an image forming apparatus comprises: a conveyance mechanism configured to convey a printing medium to which a wireless tag is attached; a wireless tag communication device configured to communicate with the wireless tag; an image forming mechanism configured to form an image on the printing medium conveyed by the conveyance mechanism; a fixing device including a fixing member, a pressing member facing the fixing member, a heating device configured to heat the printing medium passing between the fixing member and the pressing member, and a moving mechanism by which a distance between the fixing member and the pressing member can be changed; and a processor configured to: control the conveyance mechanism to convey a printing medium to which a wireless tag is attached, control the wireless tag communication device to perform a writing process of writing tag information to the wireless tag, and control the image forming mechanism and the fixing device to perform a forming process of forming and fixing an image on the printing medium. The processor is configured to control the fixing device to set the distance between the fixing member and the pressing member at a first distance during a first period before a first timing corresponding to completion of the writing process and at a second distance less than the first distance during a second period after the first timing.

DETAILED DESCRIPTION

Figure 1:
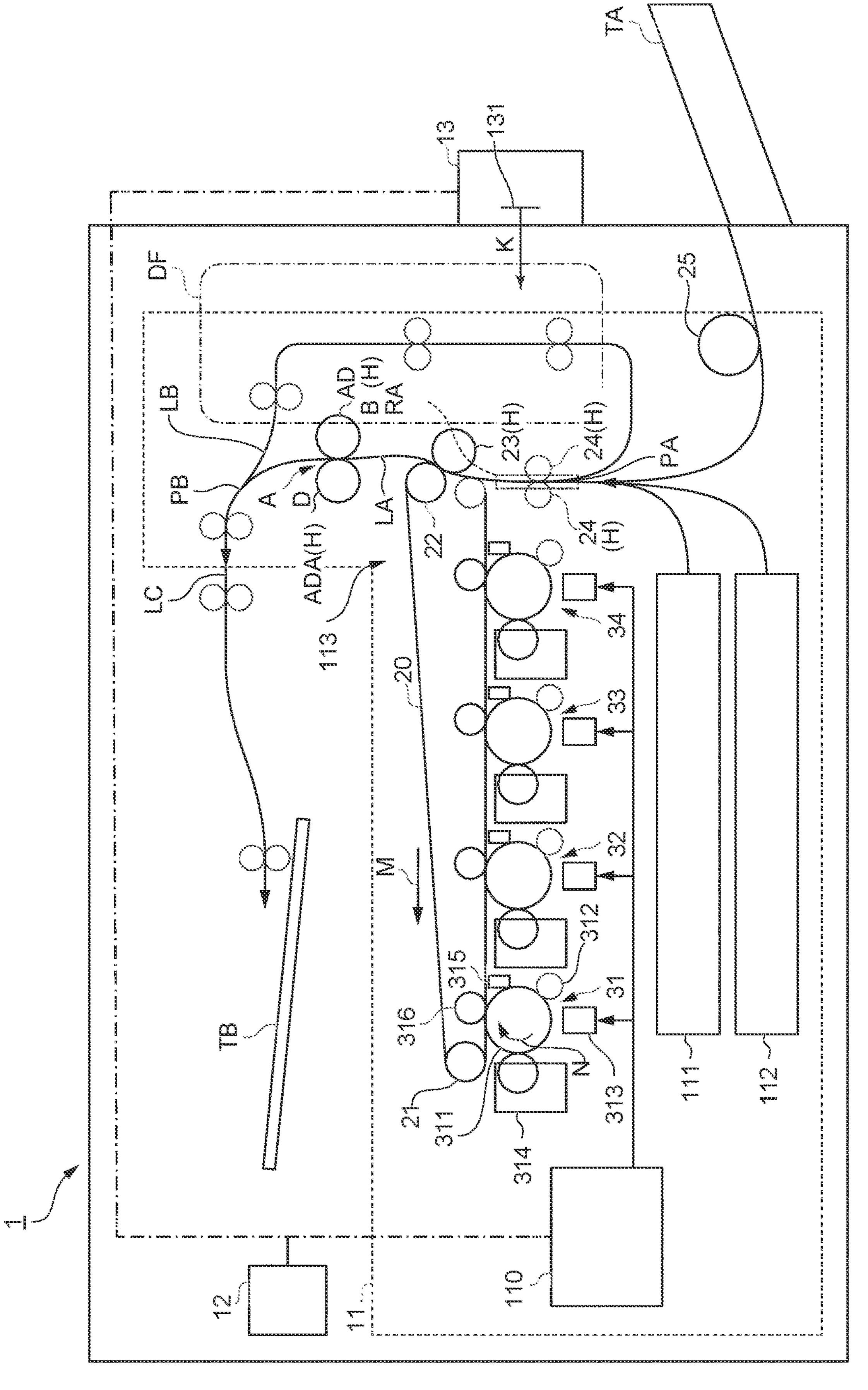
FIG. 1 is a diagram illustrating a configuration of an image forming apparatus according to an embodiment.

Hereinafter, an embodiment will be described in detail with reference to the drawings. However, the present invention is not limited to the embodiment described below.

An image forming apparatus according to an embodiment will be described with reference to the drawings. In the drawings, the same reference number is assigned to the same components. As an example of the image forming apparatus according to the embodiment, an image forming apparatus 1 will be described below.

(Configuration of Image Forming Apparatus)

A configuration of the image forming apparatus 1 will be described with reference to FIG. 1. FIG. 1 is a diagram illustrating an example of a configuration of the image forming apparatus 1 according to the embodiment.

The image forming apparatus 1 forms an image on a printing medium. For example, the image forming apparatus 1 is a multifunction peripheral, a copier, a printer, or the like. The image forming apparatus 1 is installed, for example, in a workplace. The image forming apparatus 1 performs a process, such as image formation, on the printing medium. The printing medium may be any sheet-like medium on at least one side of which an image can be formed. For example, the printing medium is a printing sheet, a plastic film, or the like.

The image forming apparatus 1 identifies a type of printing medium, on which a process desired by the user is to be performed, in accordance with an operation received from the user. Printing media are classified according to their size, thickness, and material and whether the printing media have a wireless tag. A printing medium having a wireless tag indicates a printing medium to which a wireless tag is attached. A printing medium not having a wireless tag indicates a printing medium to which no wireless tag is attached. For convenience of explanation, a printing medium having a wireless tag is referred to as a tagged printing medium, and a printing medium having no wireless tag is referred to as an untagged printing medium.

Figure 2:
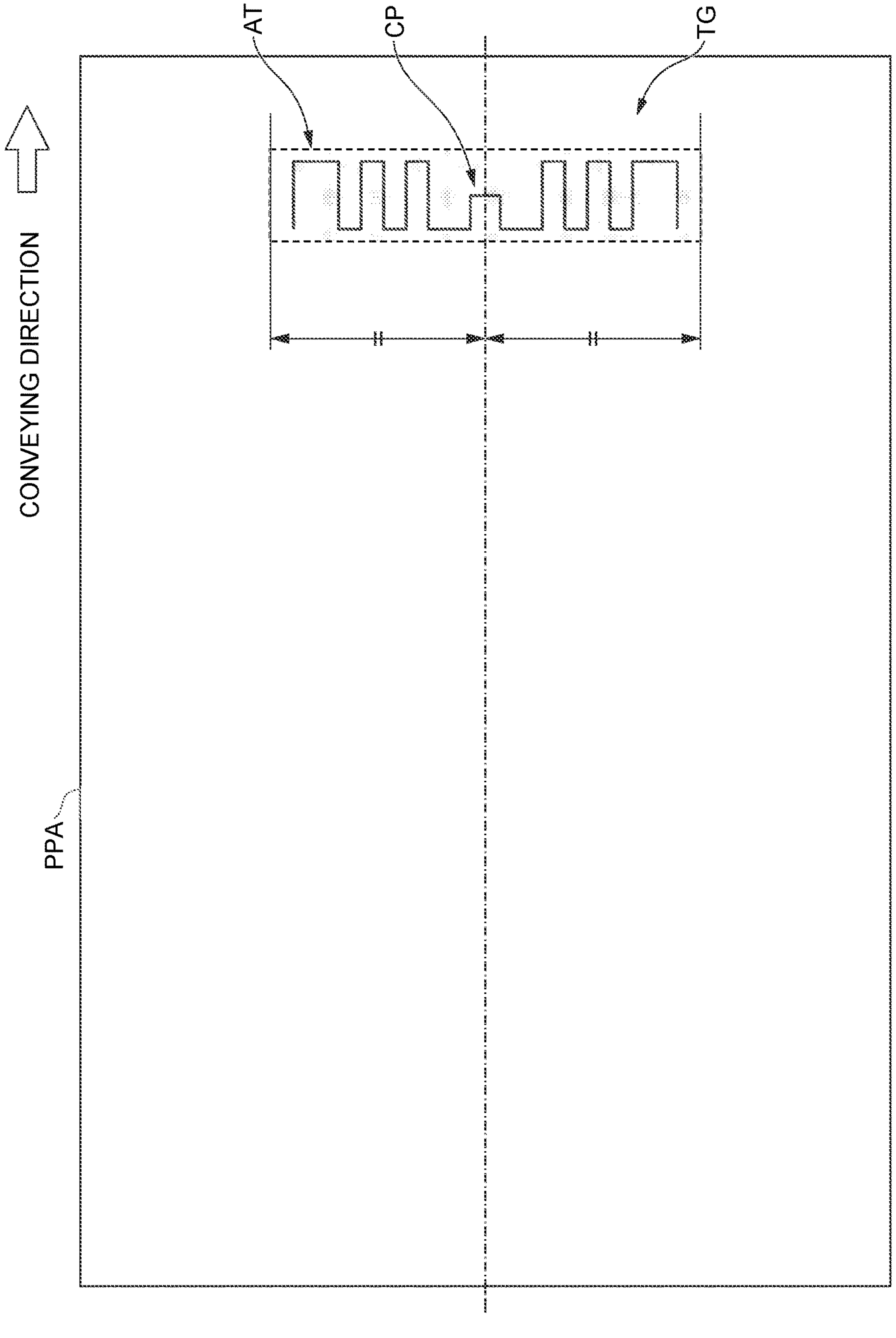
FIG. 2 is a diagram illustrating a layout of a tagged printing medium according to the embodiment.

The wireless tag is, for example, but not limited to, a radio frequency identification (RFID) tag. FIG. 2 is a diagram illustrating an example of a layout of a tagged printing medium. An arrow illustrated in FIG. 2 indicates a conveying direction in which a printing medium is conveyed in the image forming apparatus 1. A printing medium PPA illustrated in FIG. 2 is an example of a tagged printing medium. A wireless tag TG illustrated in FIG. 2 is an example of a wireless tag attached to the printing medium PPA. The wireless tag TG includes an integrated circuit (IC) chip CP and an antenna AT. Tag information is written to and read from the IC chip CP. The antenna AT is connected to the IC chip CP and configured to receive tag information to be written to the IC chip CP and transmit tag information read from the IC chip CP.

The image forming apparatus 1 forms an image on a printing medium of a type identified in advance in accordance with an operation received from the user. For example, when a tagged printing medium is identified in advance in accordance with an operation received from the user, the image forming apparatus 1 performs a writing-and-forming process on the tagged printing medium. The writing-and-forming process includes a writing process of writing tag information to a wireless tag attached to the tagged printing medium and a forming process of forming an image on the tagged printing medium. For example, the image forming apparatus 1 starts conveying the tagged printing medium. After starting the conveyance of the tagged printing medium, the image forming apparatus 1 waits until the tagged printing medium reaches a predetermined writing area RA on a conveyance path along which the tagged printing medium is conveyed. After the tagged printing medium reaches the writing area RA, the image forming apparatus 1 pauses the conveyance of the tagged printing medium and writes tag information to the wireless tag. After the tag information is written to the wireless tag, the image forming apparatus 1 performs a verification process of determining whether the writing of the tag information to the wireless tag has been successfully completed. In the verification process, the image forming apparatus 1 reads the tag information that has been written to the wireless tag and determines whether the read tag information matches the written tag information. When it is determined that the read tag information matches the written tag information, the image forming apparatus 1 determines that the writing has been successfully completed. On the other hand, when it is determined that the read tag information does not match the written tag information, the image forming apparatus 1 determines that the writing has not been completed successfully. In the verification process, when it is determined that the writing has not been successfully completed, the image forming apparatus 1 discharges the tagged printing medium and displays information indicating that the writing has failed. On the other hand, when it is determined that the writing has been successfully completed in the verification process, the image forming apparatus 1 resumes the conveyance of the tagged printing medium having the wireless tag to which the tag information has been written and forms an image on the tagged printing medium. After forming the image on the tagged printing medium, the image forming apparatus 1 heats the tagged printing medium, on which the image has been formed, to fix the image to the tagged printing medium. After fixing the image to the tagged printing medium, the image forming apparatus 1 discharges the tagged printing medium to which the image has been fixed. The image forming apparatus 1 performs the above-described writing-and-forming process on a tagged printing medium. The forming process is related to the formation of an image on a tagged printing medium among processes included in the writing-and-forming process. The writing process is related to the writing of tag information to a wireless tag attached to the tagged printing medium among the processes included in the writing-and-forming process. The writing process includes a process of writing tag information to a wireless tag and a verification process of determining whether the writing has been completed successfully.

When multiple writing-and-forming processes are consecutively performed on multiple tagged printing media, the image forming apparatus 1 separately performs the writing-and-forming process on each of the multiple tagged printing media. For example, when a writing-and-forming process on a tagged printing medium XA and a writing-and-forming process on a tagged printing medium XB are consecutively performed, the image forming apparatus 1 performs the two writing-and-forming processes such that the periods during which the two writing-and-forming processes are performed do not overlap each other. This is because, when tag information is written to the wireless tag attached to the tagged printing medium XA before the discharge of the tagged printing medium XB is completed, the tag information to be written to the wireless tag attached to the tagged printing medium XB may overwrite the tag information in the wireless tag attached to the tagged printing medium XA. That is, the image forming apparatus 1 separately performs writing-and-forming processes on multiple tagged printing media such that they do not overlap each other in time. This makes it possible to make the distance between the tagged printing media sufficiently long and thereby prevent tag information from being written to a wrong wireless tag. However, increasing the distance between the tagged printing media increases the driving time of a fixing device included in the image forming apparatus 1. As a result, the life of the fixing device of the image forming apparatus 1 may decrease.

For the above reason, the image forming apparatus 1 is configured to change driving modes of the fixing device of the image forming apparatus 1 during a period in which a writing and forming process is performed. With this configuration, the image forming apparatus 1 can prevent tag information from being written to a wrong wireless tag and also prevent the life of the fixing device from decreasing. Details of changing driving modes of the fixing device will be described later.

The image forming apparatus 1 includes, for example, a printer unit 11, a control panel 12, a wireless tag communication device 13, a manual feed tray TA, and a sheet discharge tray TB. In addition to the printer unit 11, the control panel 12, the wireless tag communication device 13, the manual feed tray TA, and the sheet discharge tray TB, the image forming apparatus 1 may be configured to include other components, other devices, and the like. The image forming apparatus 1 may be configured to not include the wireless tag communication device 13. In this case, the wireless tag communication device 13 is connected for communication to the image forming apparatus 1 as an external device.

The printer unit 11, for example, conveys a printing medium and forms an image on the printing medium.

The control panel 12 includes an operation receiving unit and a display unit.

The operation receiving unit receives an operation from the user. The operation receiving unit is an input device, such as a touch pad or input keys. The operation receiving unit outputs information indicating an operation received from the user to the control unit 110.

The display unit displays an image corresponding to an operation received via the operation receiving unit. The display unit is an image-display device (or a display), such as a liquid crystal display or an organic electroluminescence (EL) display. The display unit may be integrated with the operation receiving unit to form a touch panel.

The wireless tag communication device 13 radiates a radio wave to a writing area RA. The wireless tag communication device 13 includes a flat-plate-shaped housing and an antenna 131 that is disposed in the housing and radiates a radio wave to the writing area RA. The wireless tag communication device 13 radiates a radio wave in a radiation direction that is from one of two surfaces of the housing toward the other one of the two surfaces and among directions orthogonal to the two surfaces of the housing. An arrow K shown in FIG. 1 indicates an example of the radiation direction.

The antenna 131 is, for example, a single antenna that radiates a radio wave to the writing area RA. Alternatively, the antenna 131 may be comprised of multiple antennas.

The wireless tag communication device 13 causes the antenna 131 to radiate a radio wave toward the writing area RA under the control of a control unit that controls the image forming apparatus 1. With this configuration, the wireless tag communication device 13 can write tag information to a wireless tag attached to a tagged printing medium and perform a verification process on the written tag information. Any known method or any method to be developed may be used to write tag information to a wireless tag. Therefore, descriptions of the method of writing tag information to a wireless tag are omitted here. Any known method or any method to be developed may be used to verify tag information written to a wireless tag. Therefore, descriptions of the method of verifying written tag information are omitted here.

(Configuration of Printer Unit)

Next, a configuration of the printer unit 11 will be described.

The printer unit 11 includes a control unit 110, a sheet feed cassette 111, a sheet feed cassette 112, and an image forming unit 113.

The control unit 110 controls the entire image forming apparatus 1. In other words, the control unit 110 controls each of the printer unit 11, the control panel 12, the wireless tag communication device 13, and the image forming unit 113.

The sheet feed cassette 111 stores printing media of a type desired by the user. As an example, tagged printing media are stored in the sheet feed cassette 111.

The sheet feed cassette 112 stores printing media of a type desired by the user. As an example, untagged printing media are stored in the sheet feed cassette 112.

The image forming unit 113 conveys a printing medium and forms an image, which is indicated by image data acquired from the control unit 110, on the printing medium under the control of the control unit 110. The image forming unit 113 is an example of an image forming mechanism. Image data is acquired from, for example, an information processing apparatus that is connected for communication to the image forming apparatus 1.

The image forming unit 113 includes an intermediate transfer belt 20. The image forming unit 113 also includes a driven roller 21, a backup roller 22, a secondary transfer roller 23, two registration rollers 24, and a manual feed roller 25. The image forming unit 113 includes four image forming stations: an image forming station 31, an image forming station 32, an image forming station 33, and an image forming station 34. The image forming unit 113 includes a fixing device AD (which may also be referred to as a fuser) and a duplex feeder DF.

The intermediate transfer belt 20 is a belt to which a toner image is primarily transferred by the four image forming stations. The intermediate transfer belt 20 is supported by the driven roller 21, the backup roller 22, and the like. The intermediate transfer belt 20 rotates in a direction indicated by an arrow M in FIG. 1. More specifically, the image forming unit 113 rotates the intermediate transfer belt 20 in this direction with a motor (not shown) under the control of the control unit 110.

The image forming station 31 is a Y (yellow) image forming station. The image forming station 32 is an M (magenta) image forming station. The image forming station 33 is a C (cyan) image forming station. The image forming station 34 is a K (black) image forming station. In the image forming unit 113, the four image forming stations are arranged below the intermediate transfer belt 20 along the rotation direction of the intermediate transfer belt 20.

The image forming station 31 includes a photoconductor drum 311, a charger 312, an exposure scanning head 313, a developing device 314, a photoconductor cleaner 315, and a primary transfer roller 316. In the image forming station 31, the charger 312, the exposure scanning head 313, the developing device 314, the photoconductor cleaner 315, and the primary transfer roller 316 are disposed around the photoconductor drum 311 that rotates in a direction indicated by an arrow N in FIG. 1. The primary transfer roller 316 faces the photosensitive drum 311 via the intermediate transfer belt 20.

The configurations of the image forming station 32, the image forming station 33, and the image forming station 34 are substantially the same as that of the image forming station 31. Therefore, descriptions of the configurations of the image forming station 32, the image forming station 33, and the image forming station 34 are omitted here.

The secondary transfer roller 23 faces the backup roller 22 via the intermediate transfer belt 20. The secondary transfer roller 23 secondarily transfers a toner image primarily transferred to the intermediate transfer belt 20 to a printing medium passing between the secondary transfer roller 23 and the intermediate transfer belt 20.

The two registration rollers 24 convey a printing medium taken out by a conveyance device (not shown) from one of the sheet feed cassette 111, the sheet feed cassette 112, and the manual feed tray TA to the nip between the secondary transfer roller 23 and the intermediate transfer belt 20.

The manual feed roller 25 takes out a printing medium from the manual feed tray TA and conveys the printing medium to the two registration rollers 24.

The fixing device AD fixes a toner image to a printing medium after the toner image is secondarily transferred by the secondary transfer roller 23 to the printing medium. More specifically, the fixing device AD heats the printing medium, to which the toner image has been transferred, while conveying the printing medium with rollers and thereby fixes the toner image to the printing medium.

After the toner image is fixed by the fixing device AD to the front side of the printing medium, the duplex feeder DF conveys the printing medium back to the two registration rollers 24. The printing medium is turned upside down and then conveyed to the duplex feeder DF. Therefore, after the printing medium is conveyed to the two registration rollers 24 via the duplex feeder DF, an image is formed on the back side of the printing medium by the secondary transfer roller 23 and the fixing device AD.

(Operations of Image Forming Unit)

Next, operations of the image forming unit 113 will be described.

First, operations of the four image forming stations will be described by taking the image forming station 31 as an example.

The image forming station 31 charges the photoconductor drum 311 with the charger 312, and then exposes the photoconductor drum 311 with the exposure scanning head 313. Thus, the image forming station 31 forms an electrostatic latent image on the photoconductor drum 311. Thereafter, the image forming station 31 causes the developing device 314 to develop the electrostatic latent image on the photosensitive drum 311. The developing device 314 develops the electrostatic latent image on the photosensitive drum 311 by using a two-component developer comprised of toner and a carrier to form a toner image. The primary transfer roller 316 primarily transfers the toner image formed on the photoconductor drum 311 to the intermediate transfer belt 20. After the primary transfer, the photoconductor cleaner 315 removes toner remaining on the photoconductor drum 311.

The image formation station 31, the image formation station 32, the image formation station 33, and the image formation station 34 form a color toner image on the intermediate transfer belt 20 by using the primary transfer rollers 316. The color toner image is formed by sequentially superimposing Y (yellow), M (magenta), C (cyan), and K (black) toner images on each other.

Next, an operation of the secondary transfer roller 23 will be described. The secondary transfer roller 23 secondarily transfers the color toner image on the intermediate transfer belt 20 to a printing medium passing between the secondary transfer roller 23 and the intermediate transfer belt 20. In the descriptions below, a "toner image" may be either a color toner image or a monochrome toner image. Also, the toner image may be formed by using decoloring toner.

Next, an operation of conveying a printing medium among operations of the image forming unit 113 will be described.

At the nip between the two registration rollers 24, a printing medium taken out from one of the sheet feed cassette 111, the sheet feed cassette 112, and the manual feed tray TA is warped by a conveyance device (not shown). This makes it possible to align the leading end of the printing medium. Thereafter, the two registration rollers 24 convey the printing medium to the nip between the secondary transfer roller 23 and the intermediate transfer belt 20 in accordance with, for example, the timing at which tag information is written to the wireless tag in the writing area RA and the timing at which the image forming unit 113 transfers the toner image to the printing medium. Conveyance paths, along which printing media taken out from the sheet feed cassette 111, the sheet feed cassette 112, and the manual feed tray TA are conveyed to the two registration rollers 24, are merged at a merging point PA shown in FIG. 1.

In the image forming unit 113, three conveyance paths including a conveyance path LA, a conveyance path LB, and a conveyance path LC are formed by the two registration rollers 24, the fixing device AD, and multiple rollers in the duplex feeder DF. The conveyance path LA extends from the merging point PA to a branching point PB illustrated in FIG. 1. The conveyance path LB passes through the duplex feeder DF and extends from the branching point PB to the merging point PA. The conveyance path LC extends from the branching point PB to the sheet discharge tray TB.

The two registration rollers 24 start to rotate in accordance with the position of the toner image on the rotating intermediate transfer belt 20, and move the printing medium to the position of the secondary transfer roller 23. As a result, the toner image formed on the intermediate transfer belt 20 is secondarily transferred to the printing medium by the secondary transfer roller 23. After the toner image is secondarily transferred to the printing medium, the secondary transfer roller 23 conveys the printing medium to the fixing device AD along the conveyance path LA.

Figure 3:
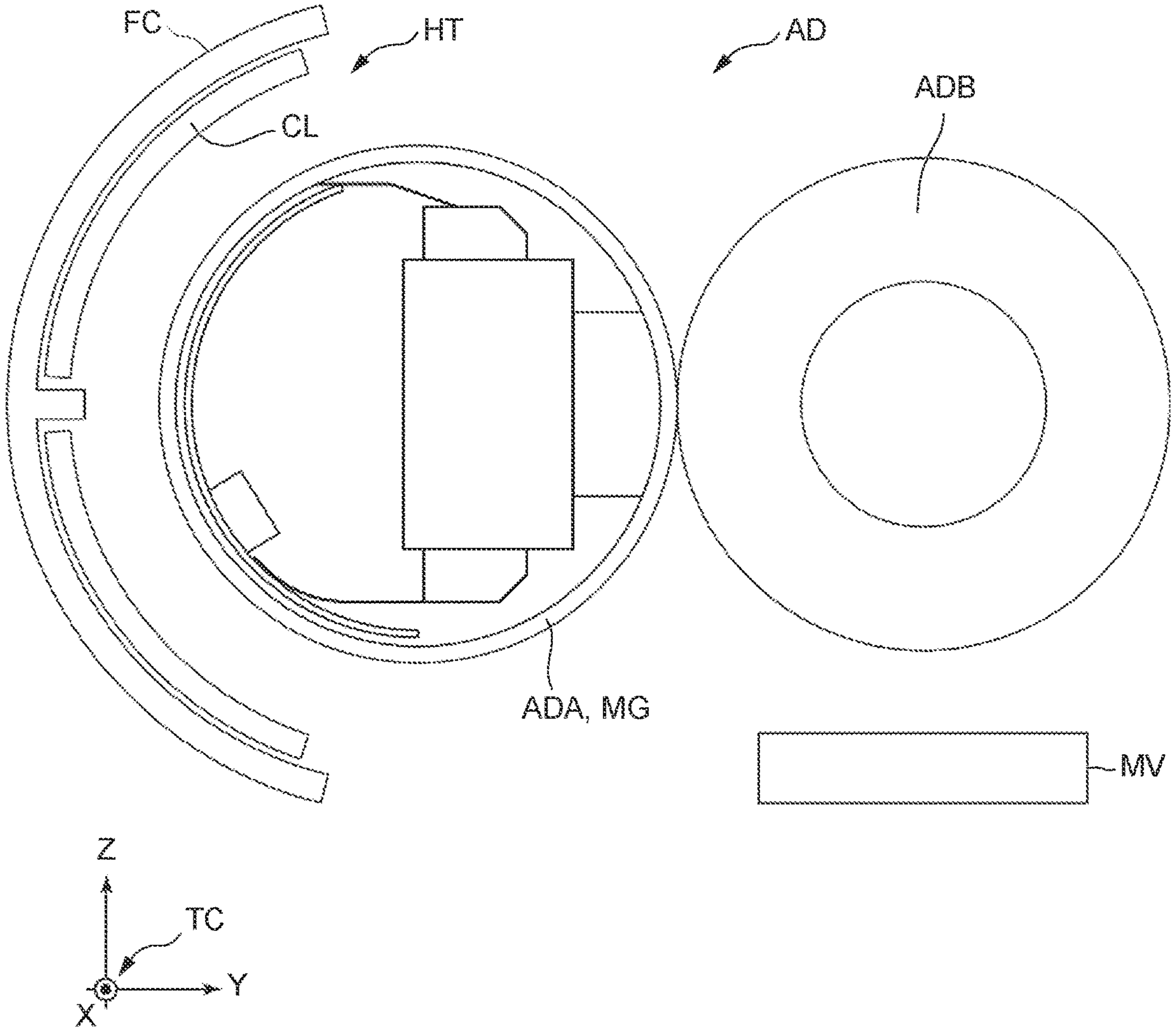
FIG. 3 is a diagram illustrating a configuration of a fixing device according to the embodiment.

The fixing device AD is an example of a fixing device (or a fuser) included in the image forming apparatus 1. The fixing device AD fixes the secondarily transferred toner image to the printing medium conveyed from the secondary transfer roller 23 while conveying the printing medium. FIG. 3 is a diagram illustrating an example of a configuration of the fixing device AD. The fixing device AD includes, for example, a fixing member ADA, a pressing member ADB facing the fixing member ADA, a heating unit HT, and a moving mechanism MV. A three-dimensional coordinate system TC is a three-dimensional Cartesian coordinate system showing directions in the drawings. In FIG. 1, for brevity, the heating unit HT and the moving mechanism MV are omitted. In FIG. 3, for brevity, the moving mechanism MV is illustrated as a rectangular object separated from other components.

The fixing member ADA has an endless peripheral surface. For example, the fixing member ADA is a belt-like member. The fixing member ADA is in contact with the outer peripheral surface of the pressing member ADB. The fixing member ADA is in contact with the pressing member ADB and rotates together with the pressing member ADB. A support member, which rotatably supports the fixing member ADA, is provided inside of the fixing member ADA. In FIG. 1 and FIG. 3, the support member is omitted in order to simplify the drawings. The fixing member ADA rotates about a rotational axis that is parallel to the X-axis of the three-dimensional coordinate system TC shown in FIG. 3.

The pressing member ADB is a roller that is brought into contact with the outer peripheral surface of the fixing member ADA. The driving force of a motor (not shown) is transmitted to the pressing member ADB via a gear or the like. In other words, the pressing member ADB is rotated by the motor. The pressing member ADB rotates about a rotational axis that is parallel to the X-axis of the three-dimensional coordinate system TC shown in FIG. 3. The driving force of the motor may be transmitted to the fixing member ADA instead of being transmitted to the pressing member ADB.

The pressing member ADB is pressed against the outer peripheral surface of the fixing member ADA by the moving mechanism MV. The pressing member ADB is pressed against the fixing member ADA and thereby forms a nip with the fixing member ADA. In other words, the pressing member ADB contacts the fixing member ADA and thereby forms a nip with the fixing member ADA. In the fixing device AD, instead of the configuration in which the pressing member ADB is pressed by the moving mechanism MV against the outer peripheral surface of the fixing member ADA, the fixing member ADA may be pressed against the outer peripheral surface of the pressing member ADB by the moving mechanism MV.

The heating unit HT is a heating device that heats the fixing member ADA. In the example illustrated in FIG. 3, the heating unit HT is an induction heating (IH) device. When the heating unit HT is an IH device, the fixing member ADA includes, for example, a base layer including polyimide resin, a heat-resistant elastic layer including silicone rubber, and a heating element MG used as a heat generating layer. The heating unit HT includes a ferrite core FC and an IH coil CL provided on the ferrite core FC.

The ferrite core FC is provided outside of the fixing member ADA so that magnetic flux generated by the IH coil CL concentrates on the fixing member ADA. In the example shown in FIG. 3, the ferrite core FC is curved along the outer peripheral surface of the fixing member ADA and is disposed opposite the pressing member ADB across the fixing member ADA.

The IH coil CL is provided on the inner peripheral surface of the ferrite core FC and generates magnetic flux corresponding to an alternating current supplied from the control unit 110. The inner peripheral surface of the ferrite core FC faces the outer peripheral surface of the fixing member ADA. In other words, the inner peripheral surface of the ferrite core FC faces the fixing member ADA. The IH coil CL heats the heating element MG, which is included in the fixing member ADA as a heat generating layer, with the generated magnetic flux. That is, the IH coil CL heats the fixing member ADA with the generated magnetic flux.

The heating element MG functions as a heat generating layer included in the fixing member ADA and may be implemented by any object that generates heat when receiving magnetic flux generated by the IH coil CL. As a non-limiting example, the heating element MG may be implemented by a non-magnetic metal such as nickel or copper. The fixing member ADA includes the heating element MG as a heat generating layer and can heat the surface of a printing medium with heat generated by the heating element MG.

The heating unit HT and the fixing member ADA may have any other configurations as long as the function of the fixing device AD described in the present embodiment can be achieved.

The moving mechanism MV changes the distance between the fixing member ADA and the pressing member ADB. The moving mechanism MV includes, for example, an actuator, a linking mechanism, and the like. The moving mechanism MV may have any configuration as long as of the moving mechanism MV can change the distance between the fixing member ADA and the pressing member ADB under the control of the control unit 110. The distance between the fixing member ADA and the pressing member ADB may be represented by, for example, the shortest distance between the outer peripheral surface of the fixing member ADA and the outer peripheral surface of the pressing member ADB.

As described above, the fixing device AD includes the heating unit HT that heats a printing medium. The fixing device AD heats a printing medium passing between the fixing member ADA and the pressing member ADB and fixes a toner image to the printing medium. As a result, an image is formed on the printing medium. The fixing device AD conveys the printing medium to the conveyance path LC after the image is formed on the printing medium. The printing medium conveyed to the conveyance path LC is discharged by rollers (not shown).

In double-sided printing, after an image is formed on the front side of a printing medium and the entire printing medium passes through the branching point PB, rollers (not shown) convey the printing medium to the conveyance path LB in a switchback manner. As a result, the printing medium is turned upside down. Then, multiple rollers in the duplex feeder DF convey the printing medium along the conveyance path LB to the nip between the two registration rollers 24. The printing medium, which has been turned upside down, is conveyed along the conveyance path LA by the two registration rollers 24, and another toner image is fixed to the printing medium by the fixing device AD. As a result, an image is formed on the back side of the printing medium. The fixing device AD conveys the printing medium, on the back side of which the image has been formed, to the conveyance path LC, and the printing medium is discharged.

Thus, the secondary transfer roller 23, the two registration rollers 24, the fixing device AD, and the rollers in the duplex feeder DF constitute a conveyance unit H or a conveyance mechanism that conveys a printing medium in the image forming apparatus 1.

(Method of Changing Driving Modes of Fixing Device by Image Forming Apparatus in Writing-and-Forming Process)

A method of changing driving modes of the fixing device AD by the image forming apparatus 1 in a writing-and-forming process will be described below. The image forming apparatus 1 changes driving modes of the fixing device AD during a writing-and-forming process. More specifically, when the image forming apparatus 1 performs a writing-and-forming process on a tagged printing medium, the image forming apparatus 1 sets the distance between the fixing device AD and the pressing member ADB at different values in a first period and a second period of the writing-and-forming process. For convenience of explanation, the tagged printing medium will be referred to as a target tagged printing medium. For convenience of explanation, the writing-and-forming process will be referred to as a target writing-and-forming process. For convenience of explanation, the first period will be referred to as a target first period. For convenience of explanation, the second period will be referred to as a target second period.

The target first period is included in a period that is during the target writing-and-forming process and before a first timing corresponding to the completion of the writing process in the target writing-and-forming process. More specifically, the target first period is included in a period from a second timing corresponding to the start of conveyance of the target tagged printing medium to the first timing. The first timing may be a timing at which the writing process is completed, a timing that is a first predetermined time after the timing at which the writing process is completed, or a timing that is the first predetermined time before the timing at which the writing process is completed. The first predetermined time may be any amount of time but is preferably as short as possible to prevent the time required for the writing-and-forming process from increasing. In the present embodiment, it is assumed that the first timing is a timing at which the writing process is completed. The second timing may also be a timing at which the conveyance of the target tagged printing medium is started, a timing at which the target writing-and-forming process is started, or a timing at which the image forming apparatus 1 receives an operation or a request for starting the target writing-and-forming process. The second timing may be a timing that is a second predetermined time after the timing at which the conveyance of the target tagged printing medium is started, a timing that is the second predetermined time before the timing at which the conveyance of the target tagged printing medium is started, or a timing corresponding to the start of the conveyance of the target tagged printing medium. The second predetermined time may be any amount of time but is preferably as short as possible to prevent the time required for the target writing-and-forming process from increasing. In the present embodiment, it is assumed that the second timing is a timing at which the target writing-and-forming process is started. In this case, the first period is from the timing at which the target writing-and-forming process is started to the timing at which the writing process is completed.

The target second period is included in a period that is during the target writing-and-forming process and after the first timing corresponding to the completion of the writing process of the target writing-and-forming process. More specifically, the target second period is included in a period from the first timing to a third timing corresponding to the output of the target tagged printing medium from the fixing device AD. The third timing may be a timing at which the target tagged printing medium is output from the fixing device AD, a timing that is a third predetermined time after the timing at which the target tagged printing medium is output from the fixing device AD, or a timing that is the third predetermined time before the timing at which the target tagged printing medium is output from the fixing device AD. The third predetermined time may be any amount of time but is preferably as short as possible to prevent the time required for the target writing-and-forming process from increasing. The third timing may also be a timing at which the target tagged printing medium is discharged to the sheet discharge tray TB. This is because, when the target tagged printing medium is discharged to the sheet discharge tray TB, the target tagged printing medium has surely been output from the fixing device AD. The third timing may also be any other timing corresponding to the output of the target tagged printing medium from the fixing device AD. In the present embodiment, it is assumed that the third timing is a timing at which the target tagged printing medium is discharged to the sheet discharge tray TB. In this case, the second period is from the timing at which the writing process is completed to the timing at which the target tagged printing medium is discharged to the sheet discharge tray TB.

The image forming apparatus 1 controls the moving mechanism MV to set the distance between the fixing member ADA and the pressing member ADB at a predetermined first distance in the target first period. The first distance may be any distance that is greater than a second distance described later. The first distance may be a distance by which the fixing member ADA and the pressing member ADB are separated from each other or may be a distance at which the fixing device AD and the pressing member ADB are brought into contact with each other. In the present embodiment, it is assumed that the first distance is a distance by which the fixing member ADA and the pressing member ADB are separated from each other. In this case, the fixing device AD and the pressing member ADB are separated from each other during the target first period. On the other hand, the image forming apparatus 1 controls the moving mechanism MV to set the distance between the fixing member ADA and the pressing member ADB at a predetermined second distance in the target second period. The second distance is less than the first distance and is determined in advance as the distance between the fixing member ADA and the pressing member ADB when a toner image transferred onto a printing medium is fixed to the printing medium. That is, the second distance is the distance between the fixing member ADA and the pressing member ADB when the fixing device AD is normally driven. That is, the fixing device AD and the pressing member ADB are in contact with each other during the target second period. With this configuration, the image forming apparatus 1 can suppress the degradation of the fixing member ADA and the pressing member ADB due to wear by changing the distance between the fixing member ADA and the pressing member ADB during the target writing-and-forming process by using the moving mechanism MV. Accordingly, compared to a configuration in which the distance between the fixing member ADA and the pressing member ADB is not changed during the target writing-and-forming process, the above configuration of the image forming apparatus 1 can prevent the life of the fixing device AD from decreasing. When writing-and-forming processes are consecutively performed on multiple tagged printing media, the image forming apparatus 1 can prevent tag information from being written to a wrong wireless tag and also prevent the life of the fixing device AD from decreasing.

Figure 4:
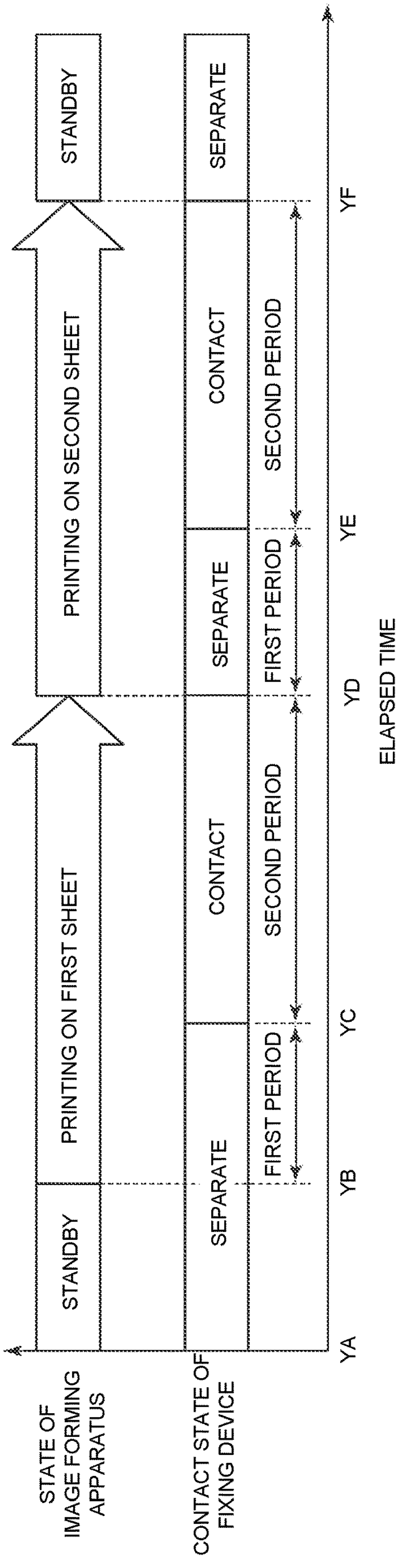
FIG. 4 is a timing chart showing a first period and a second period in each of two writing-and-forming processes that are consecutively performed.

FIG. 4 is a timing chart showing the first period and the second period in each of two writing-and-forming processes that are consecutively performed. In the example illustrated in FIG. 4, the image forming apparatus 1 performs the writing-and-forming process on a first tagged printing medium and then performs the writing-and-forming process on a second tagged printing medium. The horizontal axis in FIG. 4 indicates the elapsed time from a timing before the timing at which the writing-and-forming process for the first tagged printing medium is started. The vertical axis in FIG. 5 indicates the state of the image forming apparatus 1 at each timing indicated by the horizontal axis and the contact state of the fixing device AD at each timing indicated by the horizontal axis. In FIG. 4, the image forming apparatus 1 is in one of a state in which the image forming apparatus 1 is on standby and not performing the writing-and-forming process and a state in which the image forming apparatus 1 is performing the writing-and-forming process. "STANDBY" in FIG. 4 represents a state in which the image forming apparatus 1 is on standby and not performing the writing-and-forming process. In FIG. 4, "PRINTING ON FIRST SHEET" indicates the state in which the image forming apparatus 1 is performing the writing-and-forming process on the first tagged printing medium. In FIG. 4, "PRINTING ON SECOND SHEET" indicates the state in which the image forming apparatus 1 is performing the writing-and-forming process on the second tagged printing medium. In FIG. 4, the fixing device AD is in one of a state in which the fixing member ADA and the pressing member ADB are separated from each other and a state in which the fixing member ADA and the pressing member ADB are in contact with each other. "SEPARATE" in FIG. 4 represents a state in which the fixing member ADA and the pressing member ADB are separated from each other, that is, a state in which the distance between the fixing member ADA and the pressing member ADB is set at the first distance. On the other hand, "CONTACT" in FIG. 4 represents a state in which the fixing member ADA and the pressing member ADB are in contact with each other, that is, a state in which the distance between the fixing member ADA and the pressing member ADB is set at the second distance.

A timing YA illustrated in FIG. 4 is an example of a timing at which the elapsed time indicated by the horizontal axis of FIG. 4 starts to be measured. For example, the timing YA is a timing at which the image forming apparatus 1 receives a print job from an information processing apparatus. The print job is a request for causing the image forming apparatus 1 to consecutively perform the writing-and-forming processes on the first tagged printing medium and the second tagged printing medium.

A timing YB shown in FIG. 4 is an example of the second timing in the writing-and-forming process for the first tagged printing medium. In this example, the timing YB indicates a timing at which the writing-and-forming process for the first tagged printing medium is started. Note that the timing YB may be the same as or substantially the same as the timing YA.

A timing YC shown in FIG. 4 is an example of the first timing in the writing-and-forming process for the first tagged printing medium. In this example, the timing YC indicates a timing at which the writing process included in the writing-and-forming process for the first tagged printing medium is completed.

A timing YD shown in FIG. 4 is an example of the third timing in the writing-and-forming process for the first tagged printing medium. In this example, the timing YD indicates a timing at which the first tagged printing medium is discharged to the sheet discharge tray TB. The timing YD also indicates a timing at which the writing-and-forming process for the second tagged printing medium is started. The timing at which the first tagged printing medium is discharged and the timing at which the writing-and-forming process for the second tagged printing medium is started may be slightly different or not different from each other. In FIG. 4, it is assumed that these two timings are not different from each other. In this case, the timing YD is also an example of the second timing in the writing-and-forming process for the second tagged printing medium. That is, in this example, the timing YD is also a timing at which the writing-and-forming process for the second tagged printing medium is started.

A timing YE shown in FIG. 4 is an example of the first timing in the writing-and-forming process for the second tagged printing medium. In this example, the timing YE indicates a timing at which the writing process included in the writing-and-forming process for the second tagged printing medium is completed.

A timing YF shown in FIG. 4 is an example of the third timing in the writing-and-forming process for the second tagged printing medium. In this example, the timing YF indicates a timing at which the second tagged printing medium is discharged to the sheet discharge tray TB.

In the example illustrated in FIG. 4, the image forming apparatus 1 is on standby and not performing the writing-and-forming process during a period from the timing YA to the timing YB. Therefore, in the image forming apparatus 1, the fixing member ADA and the pressing member ADB are separated from each other during this period. That is, the distance between the fixing member ADA and the pressing member ADB is set at the first distance. This is to prevent the fixing member ADA and the pressing member ADB from being degraded due to wear while the image forming apparatus 1 is on standby and not performing the writing-and-forming process.

In the example illustrated in FIG. 4, the period from the timing YB to the timing YC is an example of the first period in the writing-and-forming process for the first tagged printing medium. The image forming apparatus 1 performs the writing process included in the writing-and-forming process during the first period. Then, the image forming apparatus 1 completes the writing process at the timing YC. During the first period, the first tagged printing medium does not pass through the fixing device AD. For this reason, in the image forming apparatus 1, the fixing member ADA and the pressing member ADB are separated from each other during the first period. That is, the distance between the fixing member ADA and the pressing member ADB is set at the first distance during the first period.

In the example illustrated in FIG. 4, the period from the timing YC to the timing YD is an example of the second period in the writing-and-forming process for the first tagged printing medium. The image forming apparatus 1 performs the forming process included in the writing-and-forming process during the second period. Then, at the timing YD, the image forming apparatus 1 completes the forming process and starts the writing process included in the writing and the forming process for the second tagged printing medium. During the second period, the first tagged printing medium passes through the fixing device AD. For this reason, in the image forming apparatus 1, the fixing member ADA and the pressing member ADB are brought into contact with each other during the second period. That is, the distance between the fixing member ADA and the pressing member ADB is the second distance during the second period.

In the example illustrated in FIG. 4, the period from the timing YD to the timing YE is an example of the first period in the writing-and-forming process for the second tagged printing medium. The image forming apparatus 1 performs the writing process included in the writing-and-forming process during the first period. The image forming apparatus 1 completes the writing process at the timing YE. During the first period, the second tagged printing medium does not pass through the fixing device AD. For this reason, in the image forming apparatus 1, the fixing member ADA and the pressing member ADB are separated from each other during the first period. That is, the distance between the fixing member ADA and the pressing member ADB is set at the first distance during the first period.

In the example illustrated in FIG. 4, the period from the timing YE to the timing YF is an example of the second period in the writing-and-forming process for the second tagged printing medium. The image forming apparatus 1 performs the forming process included in the writing-and-forming process during the second period. The image forming apparatus 1 completes the forming process at the timing YF. During the second period, the second tagged printing medium passes through the fixing device AD. For this reason, in the image forming apparatus 1, the fixing member ADA and the pressing member ADB are brought into contact with each other during the second period. That is, the distance between the fixing member ADA and the pressing member ADB is set at the second distance during the second period.

In the example shown in FIG. 4, at the timing YF at which the two consecutive writing-and-forming processes are completed, the image forming apparatus 1 separates the fixing member ADA and the pressing member ADB from each other.

Here, in an image forming apparatus different from the image forming apparatus 1, the distance between the fixing member ADA and the pressing member ADB remains at the second distance during the period from the timing YB to the timing YF. This accelerates the degradation of the fixing member ADA and the pressing member ADB due to wear. Accordingly, in the image forming apparatus different from the image forming apparatus 1, even if writing of tag information to a wrong wireless tag can be prevented, the life of the fixing device AD may decrease. On the other hand, as shown in FIG. 4, the image forming apparatus 1 separates the fixing member ADA and the pressing member ADB from each other in each of the two first periods. This reduces the degradation due to wear of the fixing member ADA and the pressing member ADB. As a consequence, the image forming apparatus 1 can prevent the life of the fixing device AD from decreasing while preventing tag information from being written to a wrong wireless tag. The image forming apparatus 1 may also be configured such that the fixing member ADA and the pressing member ADB are separated from each other in one of the two first periods.

The image forming apparatus 1 may be configured to separate the fixing member ADA and the pressing member ADB from each other during a part of the period from the timing YB to the timing YC. The image forming apparatus 1 may be configured to separate the fixing member ADA and the pressing member ADB from each other during at least a part of the period from a timing at which the first tagged printing medium is output from the fixing device AD to the timing YD. The image forming apparatus 1 may be configured to bring the fixing member ADA and the pressing member ADB into contact with each other during the period from the timing YC to a timing corresponding to the completion of the output of the first tagged printing medium from the fixing device AD. In this case, the image forming apparatus 1 separates the fixing member ADA and the pressing member ADB from each other during the period from the timing corresponding to the completion of the output of the first tagged printing medium from the fixing device AD to the timing YD. In other words, the image forming apparatus 1 may be configured to change the distance between the fixing member ADA and the pressing member ADB to the first distance during the period from the timing corresponding to the output of the first tagged printing medium from the fixing device AD to a timing corresponding to the start of the conveyance of the second tagged printing medium. With the above configurations, the image forming apparatus 1 can more reliably prevent the life of the fixing device from decreasing.

The image forming apparatus 1 may be configured to separate the fixing member ADA and the pressing member ADB from each other during a part of the period from the timing YD to the timing YE. The image forming apparatus 1 may be configured to separate the fixing member ADA and the pressing member ADB from each other during at least a part of the period from a timing at which the first tagged printing medium is output from the fixing device AD to the timing YD. The image forming apparatus 1 may be configured to bring the fixing member ADA and the pressing member ADB into contact with each other during a period from the timing YE to a timing corresponding to the completion of the output of the second tagged printing medium from the fixing device AD. In this case, the image forming apparatus 1 separates the fixing member ADA and the pressing member ADB from each other during the period from the timing corresponding to the completion of the output of the second tagged printing medium from the fixing device AD to the timing YF. The timing corresponding to the completion of the output of the second tagged printing medium from the fixing device AD is an example of the third timing. With these configurations, the image forming apparatus 1 can more reliably prevent the life of the fixing device from decreasing.

(Functional Configuration of Control Unit)

Figure 5:
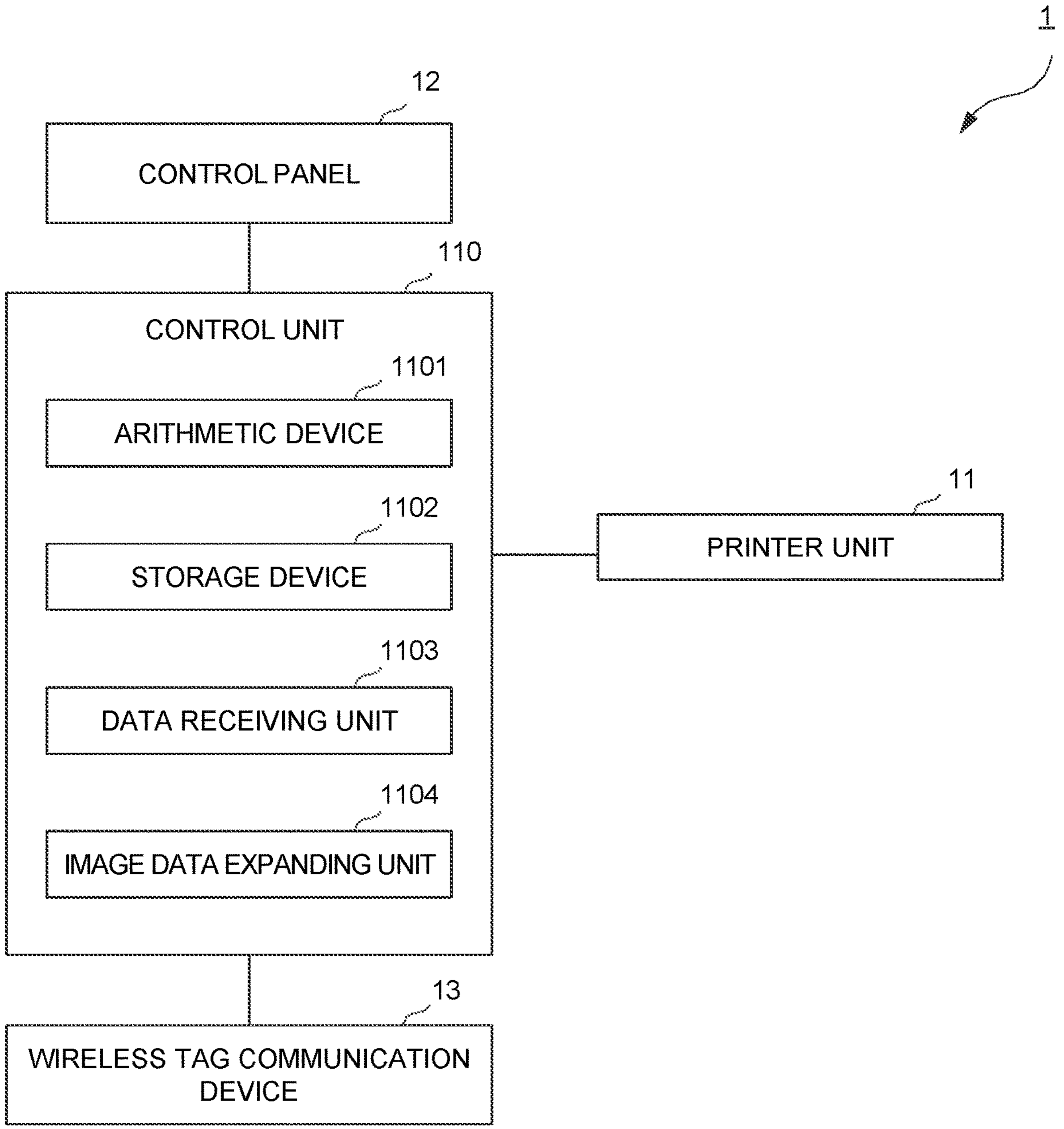
FIG. 5 is a diagram illustrating a functional configuration of a control unit according to the embodiment.

Next, a functional configuration of the control unit 110 will be described with reference to FIG. 5. FIG. 5 is a diagram illustrating an example of a functional configuration of the control unit 110.

As illustrated in FIG. 5, the control unit 110 is connected for communication to each of the printer unit 11, the control panel 12, and the wireless tag communication device 13. The control unit 110 includes an arithmetic device 1101, a storage device 1102, a data receiving unit 1103, and an image data expanding unit 1104.

The arithmetic device 1101 is a processor, such as a central processing unit (CPU) or an application specific integrated circuit (ASIC). The arithmetic device 1101 controls each of the printer unit 11, the control panel 12, and the wireless tag communication device 13 in accordance with an image processing program stored in the storage device 1102.

The storage devices 1102 is, for example, a read-only memory (ROM), a random access memory (RAM), a hard disk drive (HDD), or a solid state drive (SSD). The storage device 1102 may be provided separately from the control unit 110. The storage device 1102 is an example of a storage unit.

The data receiving unit 1103 receives print data (e.g., data written in a page description language) indicating an image to be printed from a host such as a personal computer (PC) and stores the received print data in the storage device 1102.

The image data expanding unit 1104 expands the print data stored in the storage device 1102 by the data receiving unit 1103 into data (for example, raster data) that can be printed by the printer unit 11 by, for example, setting print conditions and stores the data in the storage device 1102.

(Process of Consecutively Performing Multiple Writing-and-Forming Processes by Image Forming Apparatus)

Figure 6:
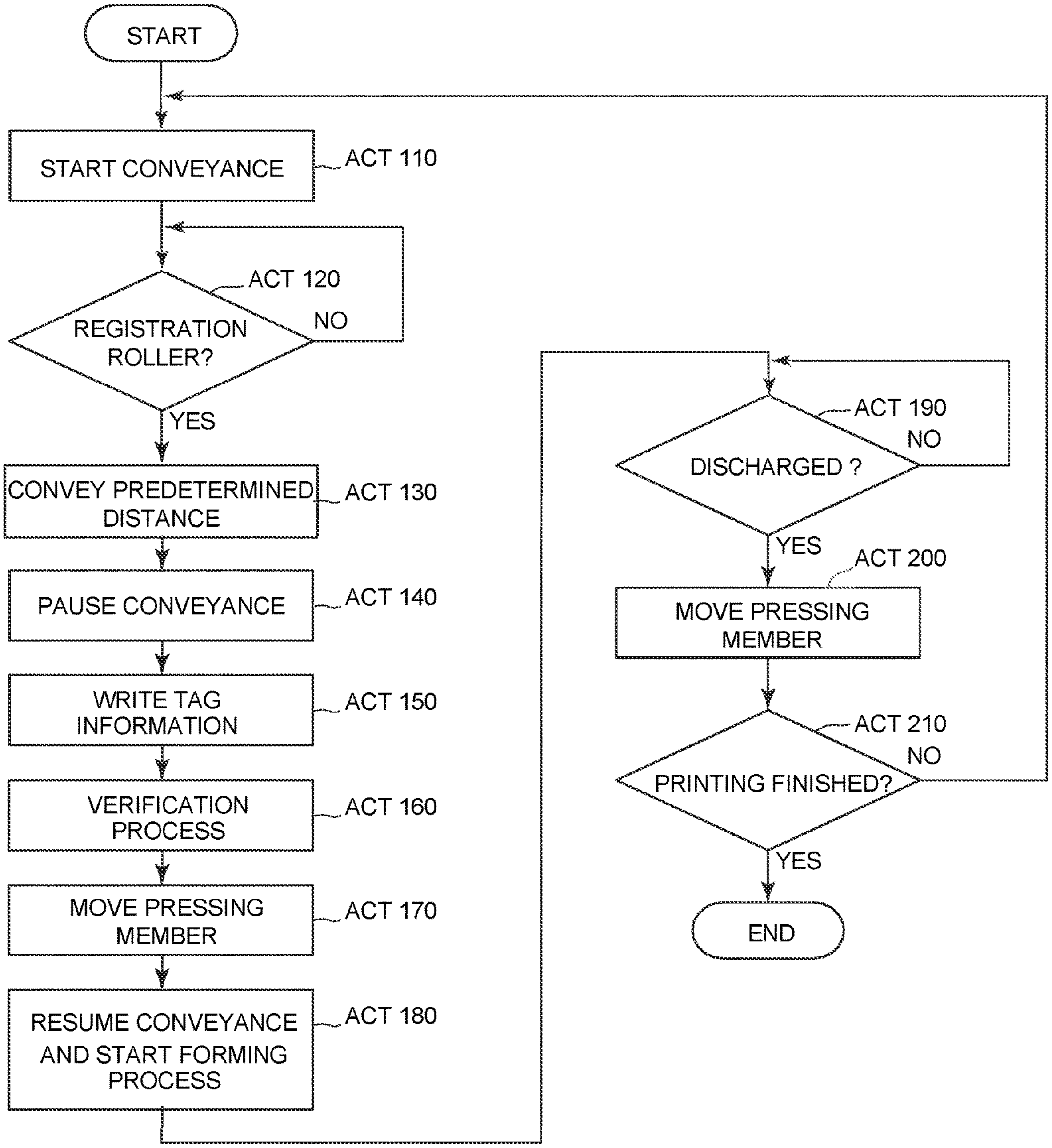
FIG. 6 is a flowchart illustrating a process in which the image forming apparatus consecutively performs multiple writing-and-forming processes.

Next, with reference to FIG. 6, a process in which the image forming apparatus 1 consecutively performs multiple writing-and-forming processes will be described. FIG. 6 is a flowchart illustrating an example of a process in which the image forming apparatus 1 consecutively performs multiple writing-and-forming processes. In the example of FIG. 6, it is assumed that the image forming apparatus 1 receives, at a timing before ACT 110 illustrated in FIG. 6, a request or a print job for causing the image forming apparatus 1 to consecutively perform multiple writing-and-forming processes. It is also assumed that, at this timing, the distance between the fixing member ADA and the pressing member ADB is set at the first distance.

After receiving the print job, the control unit 110 controls the conveyance unit H to start the conveyance of a tagged printing medium placed in the sheet feed cassette 111 (ACT 110).

Next, the control unit 110 waits until the tagged printing medium conveyed by the conveyance unit H is warped at the nip between the two registration rollers 24 (ACT 120). In FIG. 6, ACT 120 is indicated by "REGISTRATION ROLLER?". In ACT 120, any known method or any method to be developed may be used by the control unit 110 to determine whether the tagged printing medium has been warped at the nip.

When determining that the tagged printing medium conveyed by the conveyance unit H has been warped at the nip between the two registration rollers 24 (ACT 120: YES), the control unit 110 controls the two registration rollers 24 of the conveyance unit H to convey the tagged printing medium by a predetermined distance (ACT 130).

Next, the control unit 110 controls the conveyance unit H to pause the conveyance of the tagged printing medium (ACT 140). The control unit 110 thereby places the tagged printing medium in the writing area RA. In this example, the writing area RA is an area that is on the conveyance path along which the tagged printing medium is conveyed by the conveyance unit H and includes the position in which the tagged printing medium warped at the two registration rollers 24 is placed after being conveyed the predetermined distance. The writing area RA may be any other area on the conveyance path. The predetermined distance is, for example, but not limited to, about one half of the length in the conveying direction of the tagged printing medium warped at the nip between the two registration rollers 24.

Next, the control unit 110 controls the antenna 131 to write tag information specified by the received print job to the wireless tag attached to the tagged printing medium the conveyance of which has been paused at ACT 140 (ACT 150).

Next, in ACT 150, the control unit 110 performs a verification process of determining whether the writing of the tag information specified by the received print job to the wireless tag has been successfully completed (ACT 160). Since the verification process performed by the image forming apparatus 1 is a well-known process, detailed descriptions of the verification process are omitted here.

Next, the control unit 110 controls the moving mechanism MV to move the pressing member ADB and thereby change the distance between the pressing member ADB and the fixing member ADA to the second distance (ACT 170).

Next, the control unit 110 controls the conveyance unit H to resume the conveyance of the tagged printing medium paused at ACT 140 and starts the forming process on the tagged printing medium (ACT 180).

Next, the control unit 110 waits until the tagged printing medium is discharged to the sheet discharge tray TB (ACT 190). Any known method or any method to be developed may be used by the control unit 110 to determine whether the tagged printing medium has been discharged to the sheet discharge tray TB in ACT 190.

When it is determined that the tagged printing medium has been discharged to the sheet discharge tray TB (ACT 190: YES), the control unit 110 controls the moving mechanism MV to move the pressing member ADB and thereby change the distance between the fixing member ADA and the pressing member ADB to the first distance (ACT 200).

Next, the control unit 110 determines whether writing-and-forming processes for all tagged printing media requested by the received print job have been completed (ACT 210).

When it is determined that the writing-and-forming processes for all tagged printing media requested by the received print job have not been completed (ACT 210: NO), the control unit 110 returns to ACT 110 and controls the conveyance unit H to start the conveyance of the subsequent tagged printing medium.

On the other hand, when it is determined that the writing-and-forming processes for all tagged printing media requested by the received print job have been completed (ACT 210: YES), the control unit 110 terminates the process of the flowchart shown in FIG. 6.

As described above, the image forming apparatus 1 performs the writing-and-forming process including the writing process of writing tag information to a wireless tag attached to a tagged printing medium and the forming process of forming an image on the printing medium. During the writing-and-forming process performed by the image forming apparatus 1, the distance between the fixing member ADA and the pressing member ADB is set at the first distance during the first period included in a period before the first timing corresponding to the completion of the writing process and at the second distance in the second period included in a period after the first timing. With this configuration, the image forming apparatus 1 can prevent the life of the fixing device AD from decreasing while preventing tag information from being written to a wrong RFID tag.

(First Variation of Configuration of Fixing Device)

Figure 7:
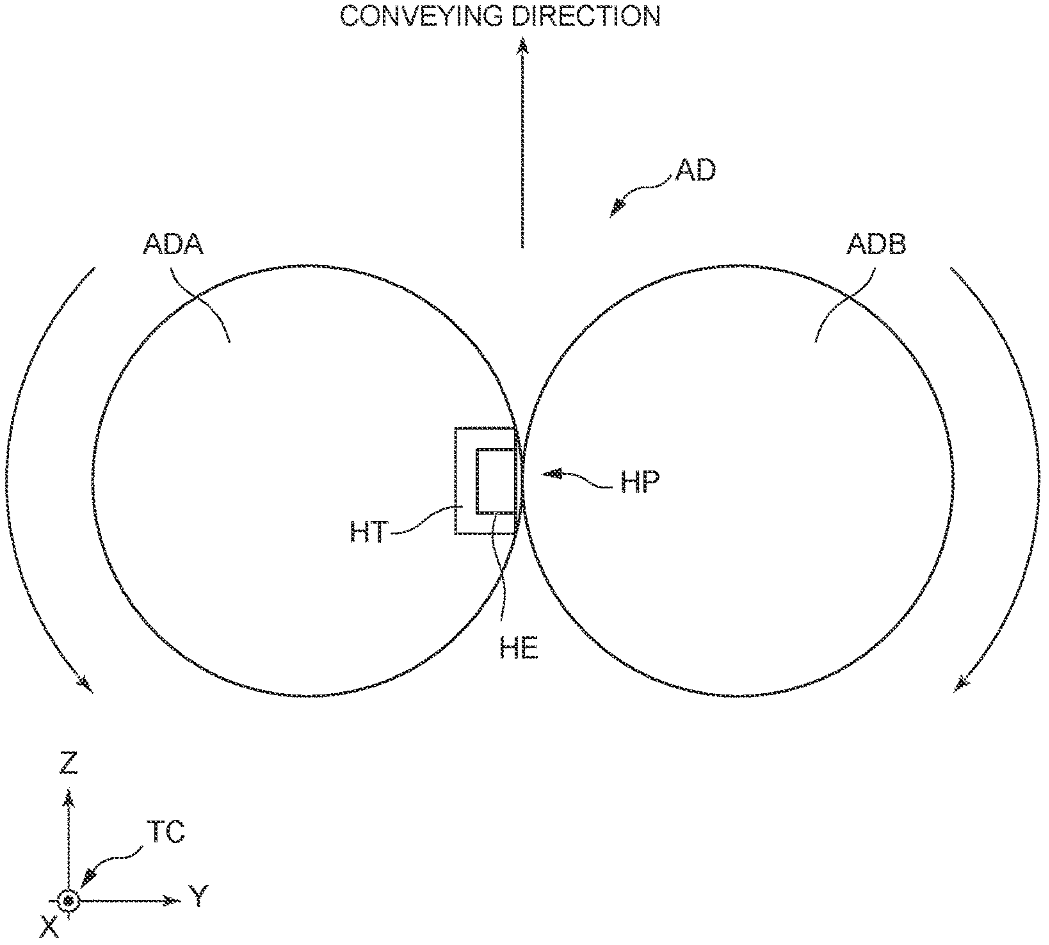
FIG. 7 is a diagram illustrating a first variation of the configuration of the fixing device.

The fixing device AD described above may have a configuration as illustrated in FIG. 7. FIG. 7 is a diagram illustrating a first variation of the configuration of the fixing device AD.

In the example illustrated in FIG. 7, the heating unit HT includes a heating element HE. The heating element HE is slidably in contact with the fixing member ADA. The heating element HE may be configured to be slidably in contact with the fixing member ADA via a protective layer made of glass or the like or may be configured to be slidably in contact with the fixing member ADA without the protective layer interposed therebetween. The heating unit HT causes the heating element HE to generate heat and thereby heats the fixing member ADA contacting the heating element HE. In the example illustrated in FIG. 7, the heating unit HT heats a heating area that is on the outer peripheral surface of the fixing member ADA and located in a heating position HP that is on the conveyance path and at which the fixing member ADA contacts the pressing member ADB. Accordingly, the heating unit HT can heat the front side of the printing medium passing between the fixing member ADA and the pressing member ADB. In FIG. 7, the heating unit HT is illustrated as a rectangular object for simplicity of illustration.

Figure 8:
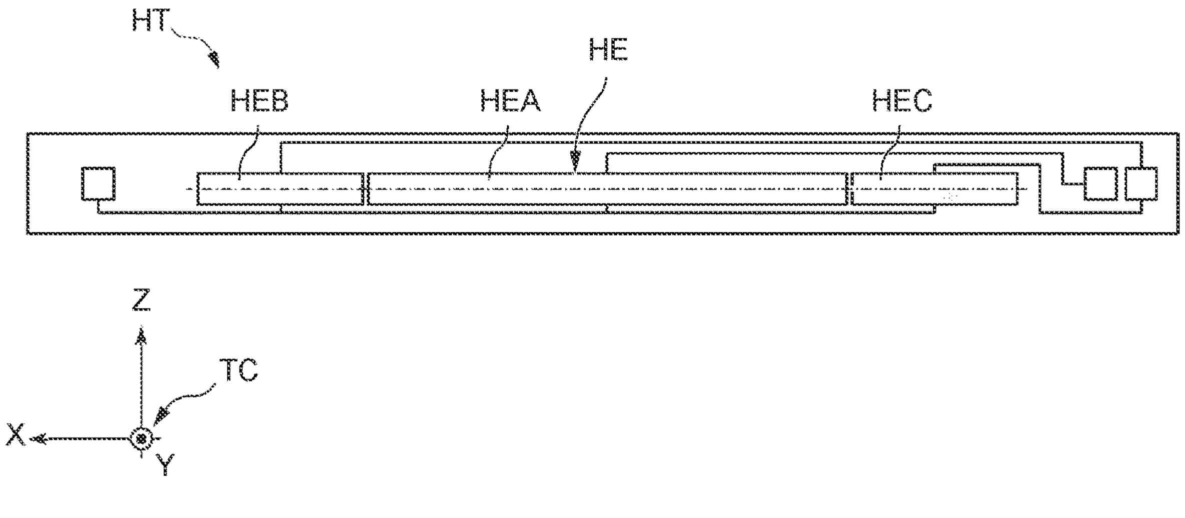
FIG. 8 is a diagram illustrating a configuration of a heating element included in a heating unit shown in FIG. 7 according to the embodiment.

FIG. 8 is a diagram illustrating an example of a configuration of the heating element HE included in the heating unit HT illustrated in FIG. 7. As shown in FIG. 8, the heating element HE extends in the axial direction of the rotation axis of the fixing member ADA. In the example illustrated in FIG. 8, the heating element HE includes three heating elements: a heating element HEA, a heating element HEB, and a heating element HEC. The heating element HEA heats an area near the center of the heating area in the axial direction. The heating element HEB heats one of the ends of the heating area in the axial direction. The heating element HEC heats the other one of the ends of the heating area in the axial direction. Therefore, in this example, the heating element HEB, the heating element HEA, and the heating element HEC are arranged in this order in the negative X-axis direction in the three-dimensional coordinate system TC. With this configuration, the heating element HE can heat the entire heating area. Each of the three heating elements is implemented by, for example, a resistor made of a silver-palladium alloy and generates heat when energized by the control unit 110. In this example, the three heating elements are provided on a substrate on which wires are printed. The wire connection configuration illustrated in FIG. 8 is merely an example, and the heating element HE may have a different wire connection configuration. Some or all of the three heating elements may be integrated.

(Second Variation of Configuration of Fixing Device)

Figure 9:
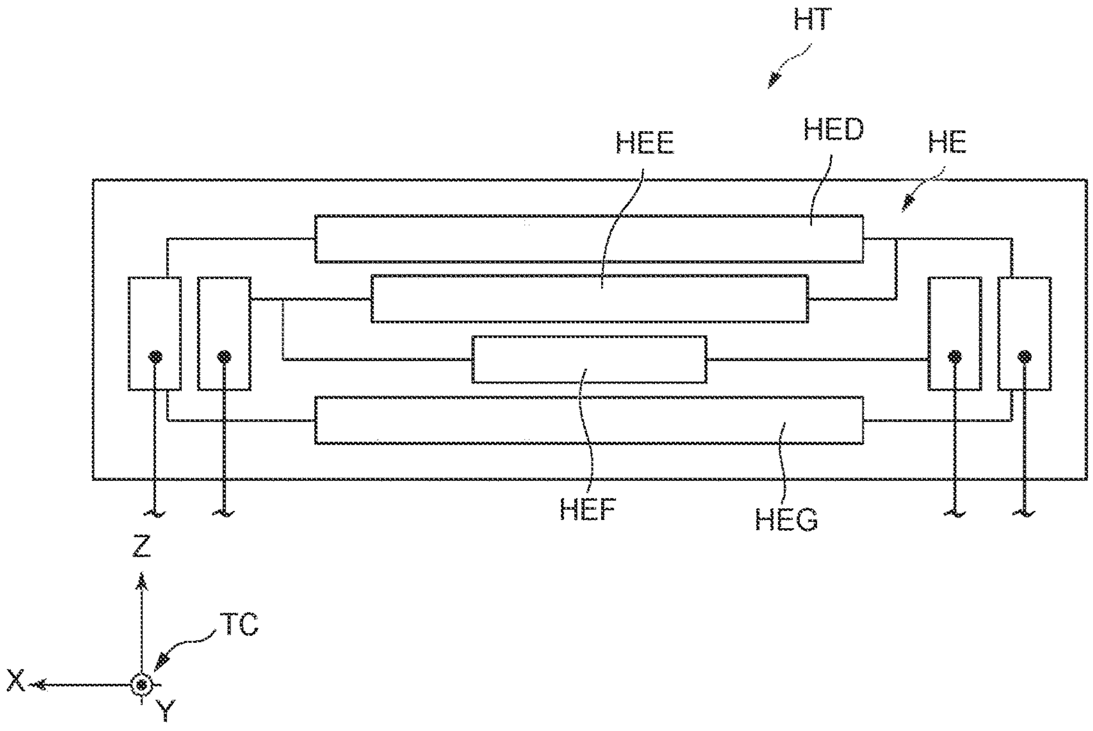
FIG. 9 is a diagram of a second variation of the configuration of the fixing device.

The fixing device AD described above may include a heating unit HT having a configuration as illustrated in FIG. 9. FIG. 9 is a diagram illustrating a second variation of the configuration of the fixing device AD. The second variation of the configuration of the fixing device AD is a variation of the first variation of the fixing device AD.

Instead of the configuration illustrated in FIG. 8, the heating element HE of the heating unit HT may have a configuration including multiple heating elements that are arranged in the conveying direction as illustrated in FIG. 9. In the example shown in FIG. 9, the heating element HE includes four heating elements: a heating element HED, a heating element HEE, a heating element HEF, and a heating element HEG. The heating element HED heats the entire heating area. The heating element HEE heats, in the heating area, an area that is narrower than the area heated by the heating element HED and wider than an area heated by the heating element HEF. The heating element HEF heats an area that is narrower than the area heated by the heating element HEE and near the center of the heating area in the axial direction. The heating element HEG heats the entire heating area. In this example, the heating element HEG, the heating element HEF, the heating element HEE, and the heating element HED are arranged in this order in the positive Z-axis direction in the three-dimensional coordinate system TC, i.e., in the conveying direction. With this configuration, the heating element HE can heat the entire heating area. Each of the four heating elements is implemented by, for example, a resistor made of a silver-palladium alloy and generates heat when energized by the control unit 110. In this example, the four heating elements are provided on a substrate on which wires are printed. The wire connection configuration illustrated in FIG. 9 is merely an example, and the heating element HE may have a different wire connection configuration. Some or all of the four heating elements may be integrated.

(Third Variation of Configuration of Fixing Device)

Figure 10:
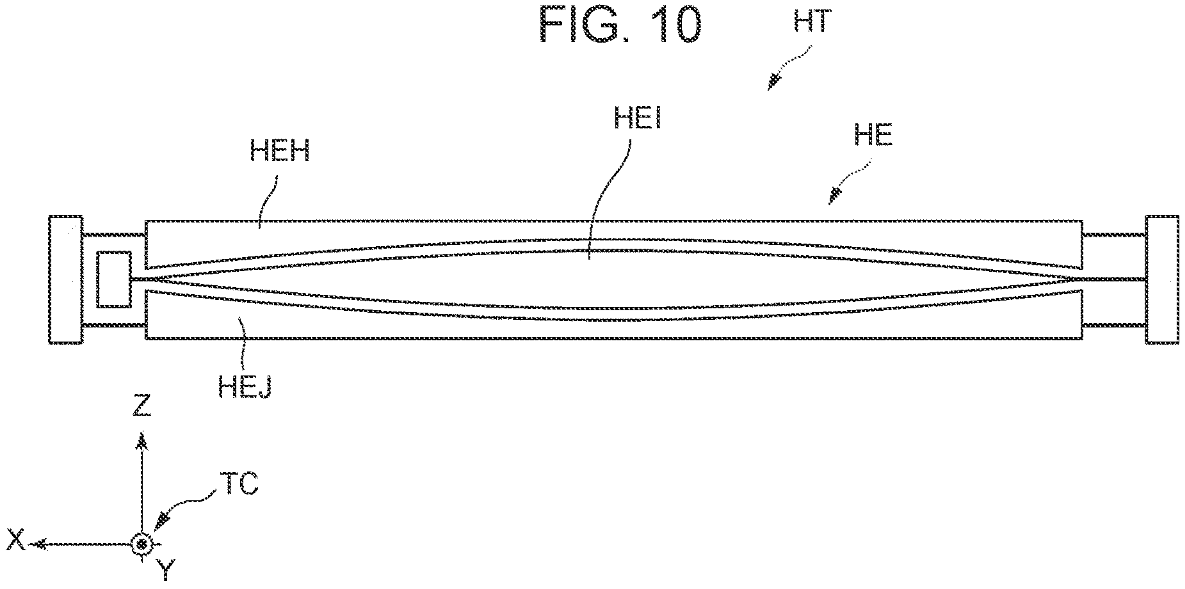
FIG. 10 is a diagram of a third variation of the configuration of the fixing device.

The fixing device AD described above may include a heating unit HT having a configuration as illustrated in FIG. 10. FIG. 10 is a diagram illustrating a third variation of the configuration of the fixing device AD. The third variation of the configuration of the fixing device AD is a variation of the second variation of the fixing device AD.

The heating element HE including multiple heating elements arranged in the conveying direction as shown in FIG. 9 may be implemented by three heating elements as shown in FIG. 10. In the example shown in FIG. 10, the heating element HE includes three heating elements: a heating element HEH, a heating element HEI, and a heating element HEJ. Each heating element among the three heating elements has a shape the thickness of which changes in the direction in which the heating element extends. In the example shown in FIG. 10, the heating element HEI is shaped like a convex lens. That is, when viewed in the negative Y-axis direction in the three-dimensional coordinate system TC, a central portion of the heating element HEI in the axial direction of the rotation axis of the fixing member ADA is thicker than the ends of the heating element HEI. The heating element HEH is shaped like a concave lens. That is, a central portion of the heating element HEH in the axial direction is thinner than the ends of the heating element HEH such that the heating element HEH mates with the heating element HEI. The heating element HEJ is shaped like a concave lens. That is, a central portion of the heating element HEJ in the axial direction is thinner than the ends of the heating element HEJ such that the heating element HEJ mates with the heating element HEI. Each of the three heating elements heats the entire heating area. In this example, the heating element HEJ, the heating element HEI, and the heating element HEH are arranged in this order in the positive Z-axis direction in the three-dimensional coordinate system TC, that is, in the conveying direction. With this configuration, the heating element HE can heat the entire heating area. Each of the three heating elements is implemented by, for example, a resistor made of a silver-palladium alloy and generates heat when energized by the control unit 110. In this example, the three heating elements are provided on a substrate on which wires are printed. The wire connection configuration illustrated in FIG. 10 is merely an example, and the heating element HE may have a different wire connection configuration. Some or all of the three heating elements may be integrated.

The features and configurations described above may be combined in any appropriate way.

As described above, the image forming apparatus 1 includes the conveyance unit H, the image forming unit 113, the fixing device AD, and the control unit 110. The conveyance unit H conveys a tagged printing medium. The image forming unit 113 forms an image on the tagged printing medium conveyed by the conveyance unit H. The fixing device AD includes the fixing member ADA, the pressing member ADB facing the fixing member ADA, the heating unit HT that heats at least a part of the fixing member ADA to heat the tagged printing medium passing between the fixing member ADA and the pressing member ADB, and a moving mechanism MV that changes the distance between the fixing member ADA and the pressing member ADB. The control unit 110 controls the antenna 131 that radiates a radio wave to the predetermined writing area RA on the conveyance path along which a tagged printing medium is conveyed by the conveyance unit H, the conveyance unit H, the image forming unit 113, and the moving mechanism MV to perform a writing-and-forming process including a writing process of writing tag information to a wireless tag attached to the tagged printing medium and a forming process of forming an image on the tagged printing medium. The control unit 110 controls the moving mechanism MV to set the distance between the fixing member ADA and the pressing member ADB at a first distance in a first period included in a period that is during the writing-and-forming process and before a first timing corresponding to the completion of the writing process and at a second distance less than the first distance in a second period included in a period that is during the writing-and-forming process and after the first timing. With this configuration, the image forming apparatus 1 can prevent the life of the fixing device AD from decreasing while preventing tag information from being written to a wrong wireless tag.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

Programs for implementing functions of components of apparatuses (for example, the image forming apparatus 1) described above may be recorded in a non-transitory computer-readable storage medium, and the programs may be read and executed by a computer system or a processor. Here, the "computer system" may include an operating system (OS) and hardware such as peripheral devices. The "non-transitory computer-readable storage medium" indicates, for example, a portable medium, such as a flexible disk, a magneto-optical disk, a ROM, or a compact disk (CD)-ROM, or a storage device, such as a hard disk included in the computer system. The "non-transitory computer-readable storage medium" may also indicate a medium, such as a volatile memory (RAM), that temporarily stores programs and is included in a computer system serving as a server or a client when the programs are transmitted via a network, such as the Internet, or a communication line, such as a telephone line.

The programs may be transmitted from a computer system, in which the programs are stored in a storage device or the like, to another computer system via a transmission medium or a transmission wave in the transmission medium. The "transmission medium" for transmitting the programs indicates a medium that has a function to transmit information and is, for example, a network (or a communication network) such as the Internet or a communication line such as a telephone line.

The programs may implement parts of the above-described functions. The programs may be difference files (or difference programs) that implement the above-described functions in combination with programs already stored in a computer system.

What is claimed is:

1. An image forming apparatus comprising:
- a conveyance mechanism configured to convey a printing medium to which a wireless tag is attached;
- a wireless tag communication device configured to communicate with the wireless tag;
- an image forming mechanism configured to form an image on the printing medium conveyed by the conveyance mechanism;
- a fixing device including a fixing member, a pressing member facing the fixing member, a heating device configured to heat the printing medium passing between the fixing member and the pressing member, and a moving mechanism by which a distance between the fixing member and the pressing member can be changed; and
- a processor configured to:
  - control the conveyance mechanism to convey a printing medium to which a wireless tag is attached,
  - control the wireless tag communication device to perform a writing process of writing tag information to the wireless tag, and
  - control the image forming mechanism and the fixing device to perform a forming process of forming and fixing an image on the printing medium, wherein
- the processor is configured to control the fixing device to set the distance between the fixing member and the pressing member at a first distance during a first period before a first timing corresponding to completion of the writing process and at a second distance less than the first distance during a second period after the first timing.

2. The image forming apparatus according to claim 1, wherein
- the first period starts at a second timing corresponding to a start of the conveyance of the printing medium.

3. The image forming apparatus according to claim 1, wherein
- the second period ends at a third timing corresponding to completion of discharge of the printing medium from the fixing device.

4. The image forming apparatus according to claim 1, wherein
- the processor is configured to control the fixing device to set the distance at the first distance after a third timing corresponding to completion of discharge of the first printing medium from the fixing device and before a fourth timing corresponding to a start of conveyance of another printing medium.

5. The image forming apparatus according to claim 4, wherein
- the processor is configured to control the fixing device to maintain the distance at the first distance until completion of the writing process on a wireless tag attached to said another printing medium.

6. The image forming apparatus according to claim 1, wherein
- the writing process includes a verification process of determining whether the writing of the tag information to the wireless tag has been successfully completed.

7. The image forming apparatus according to claim 1, wherein
- the processor is configured to control the fixing device to set the distance at the first distance during the first period to separate the fixing member and the pressing member from each other.

8. The image forming apparatus according to claim 1, wherein
- the processor is configured to control the fixing device to set the distance at the second distance during the second period to bring the fixing member and the pressing member into contact with each other.

9. The image forming apparatus according to claim 1, wherein
- the processor is configured to perform the writing process in the first period.

10. The image forming apparatus according to claim 1, wherein
- the processor is configured to perform the forming process in the second period.

11. A method performed by an image forming apparatus that includes:
- a conveyance mechanism configured to convey a printing medium to which a wireless tag is attached,
- a wireless tag communication device configured to communicate with the wireless tag,
- an image forming mechanism configured to form an image on the printing medium conveyed by the conveyance mechanism, and
- a fixing device including a fixing member, a pressing member facing the fixing member, a heating device configured to heat the printing medium passing between the fixing member and the pressing member, and a moving mechanism by which a distance between the fixing member and the pressing member can be changed, the method comprising:
- controlling the conveyance mechanism to convey a printing medium to which a wireless tag is attached;
- controlling the wireless tag communication device to perform a writing process of writing tag information to the wireless tag; and
- controlling the image forming mechanism and the fixing device to perform a forming process of forming and fixing an image on the printing medium, wherein
- the method further comprises controlling the fixing device to set the distance between the fixing member and the pressing member at a first distance during a first period before a first timing corresponding to completion of the writing process and at a second distance less than the first distance during a second period after the first timing.

12. The method according to claim 11, wherein
- the first period starts at a second timing corresponding to a start of the conveyance of the printing medium.

13. The method according to claim 11, wherein
- the second period ends at a third timing corresponding to completion of discharge of the printing medium from the fixing device.

14. The method according to claim 11, further comprising:
- controlling the fixing device to set the distance at the first distance after a third timing corresponding to completion of discharge of the first printing medium from the fixing device and before a fourth timing corresponding to a start of conveyance of another printing medium.

15. The method according to claim 14, further comprising:

controlling the fixing device to maintain the distance at the first distance until completion of the writing process on a wireless tag attached to said another printing medium.

16. The method according to claim 11, wherein the writing process includes a verification process of determining whether the writing of the tag information to the wireless tag has been successfully completed.

17. The method according to claim 11, wherein the distance between the fixing member and the pressing member is set at the first distance during the first period to separate the fixing member and the pressing member from each other.

18. The method according to claim 11, wherein the distance between the fixing member and the pressing member is set at the second distance during the second period to bring the fixing member and the pressing member into contact with each other.

19. The method according to claim 11, wherein the writing process is performed in the first period; and the forming process is performed in the second period.

20. A non-transitory computer-readable storage medium storing a program for causing a processor of an image forming apparatus to execute a process, the image forming apparatus including:

a conveyance mechanism configured to convey a printing medium to which a wireless tag is attached, a wireless tag communication device configured to communicate with the wireless tag, an image forming mechanism configured to form an image on the printing medium conveyed by the conveyance mechanism, and a fixing device including a fixing member, a pressing member facing the fixing member, a heating device configured to heat the printing medium passing between the fixing member and the pressing member, and a moving mechanism by which a distance between the fixing member and the pressing member can be changed, the process including:

controlling the conveyance mechanism to convey a printing medium to which a wireless tag is attached;

controlling the wireless tag communication device to perform a writing process of writing tag information to the wireless tag; and controlling the image forming mechanism and the fixing device to perform a forming process of forming and fixing an image on the printing medium, wherein the process further comprises controlling the fixing device to set the distance between the fixing member and the pressing member at a first distance during a first period before a first timing corresponding to completion of the writing process and at a second distance less than the first distance during a second period after the first timing.

* * * * *